United States Patent Office 2,963,950
Patented Dec. 13, 1960

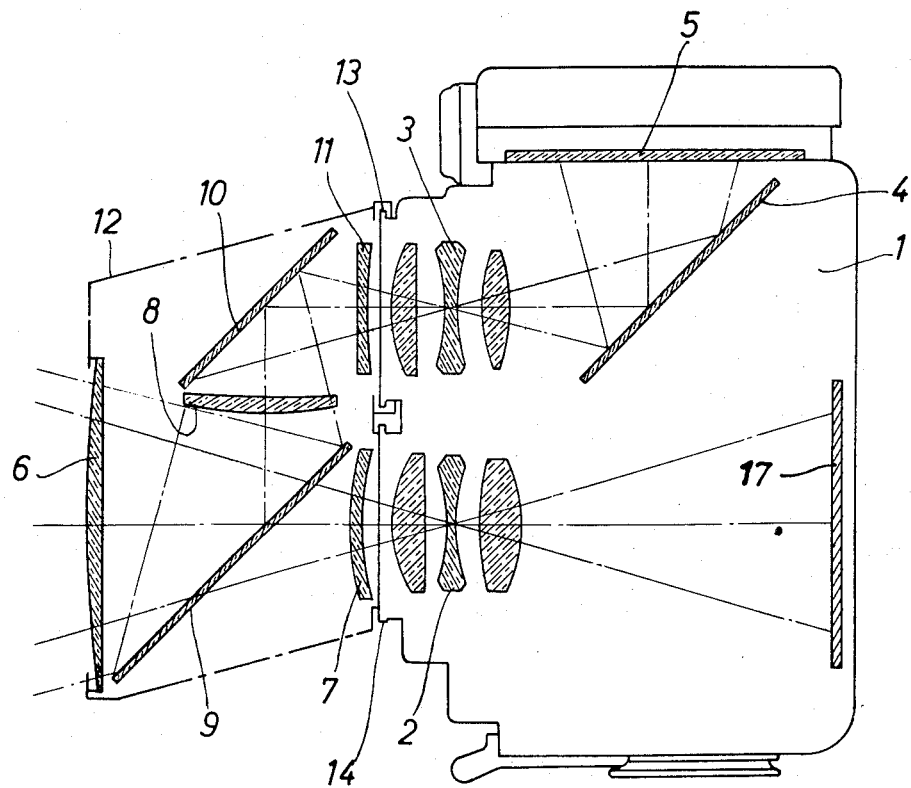

2,963,950

TWIN LENS REFLEX CAMERA

Werner Faasch and Harry Schade, Braunschweig, Germany, assignors to Franke & Heidecke, Fabrik Photographischer Prazisions-Apparate, Braunschweig, Germany, a firm of Germany Filed July 8, 1958, Ser. No. 747,201

Claims priority, application Germany July 13, 1957

1 Claim. (Cl. 95—44)

The present invention relates to reflex cameras and, more particularly, to a twin lens mirror reflex camera having a parallax compensation for the focusing viewfinder chamber which is effective for close-up exposures and for a wide variety of lenses.

An object of the invention is to provide a new and improved mirror reflex camera having parallax compensation means.

Another object is to provide a new and improved mirror reflex camera having parallax compensation means effective even in close-up exposures for producing conformity between the view-finder image and the picture-taking image.

Yet another object is the provision of a new and improved twin lens reflex camera having parallax compensation means capable of being composed of a wide range of lens powers.

A further object is to produce a new and improved twin lens camera having parallax compensation means for producing conformity between the focusing image and the picture-taking image as regards both format and perspective.

These and other desirable objects may be attained in the manner disclosed as an illustrative embodiment of the invention in the following description and in the accompanying drawing forming a part hereof, in which:

The sole figure is a schematic cross section through a twin lens reflex camera fitted with a parallax compensation lens system according to the present invention.

In the figure is shown a camera housing 1 which contains, disposed one above the other, a picture taking chamber having an exposure objective 2 and a viewfinder chamber having a focusing view-finder objective 3, both objectives being mounted on the usual movable front section shiftable forwardly and backwardly for focusing. The view-finder chamber is designed as a mirror reflex chamber. For this purpose, a mirror 4 is provided to reflect the view-finder image upwardly onto a focusing screen 5 located at the top of the camera housing. Image rays emerging from the picture taking objective 2 fall upon a film 17 during the exposure operation.

The parts thus far described may be constructed and arranged in the conventional manner already known in twin lens reflex cameras, e.g., the "Rolleiflex" and "Rolleicord" cameras manufactured by the firm of Franke & Heidecke, of Braunschweig, Germany, which cameras are well known and widely used in the United States. Those who are not already familiar with such cameras may refer to the book "Rollei Photography, Handbook of the Rolleiflex and Rolleicord Cameras," by Jacob Deschin, published in 1952 by the Camera Craft Publishing Company of San Francisco, California.

Twin lens reflex cameras have many advantages over other types of cameras, for many purposes. However, they have the disadvantage of parallax causing disconformity between the picture image and the view-finder image, particularly when the camera is focused for close-up pictures. Various forms of parallax correctors or compensators are known, and frequently give good results for moderate close-ups. But none of these gives satisfactory results for extreme close-ups. The present invention solves this problem, even for extreme close-ups, in the manner now to be described.

According to the present invention, there is provided a supplementary optical system, detachably mountable on the front of the camera, which supplementary optical system not only provides supplementary lens means to shorten the effective focal length of both the photographic objective and the finder objective, to enable close-up focusing, but also provides for both the photographic objective and the finder objective to receive light rays originating on a common viewing axis, thus eliminating the parallax problem and insuring that the finder image and the photographic image shall agree with and conform to each other not only in format but also in perspective. Broadly, this solution of the parallax problem has already been suggested, e.g., in German Patent 718,724 to Plaubel Verkaufsgesellshaft, published March 9, 1942, but the previously attempted solutions of this kind are not satisfactory for the reason that the required mirror system becomes so large that it cannot be fitted to both of the camera objectives without mutual interference. If a smaller mirror system is used full advantage cannot be taken of the entire picture area and finder area.

The present solution, overcoming the prior difficulties, is illustrated schematically in the drawing. The supplementary optical system for close-up focusing includes supplementary lens means having a front component 6 of relatively large diameter, common to the light beams for both the picture area and the focusing screen, and rear components 7 and 8, with a beam-splitting or half-silvered mirror arranged in the optical path between the front component and the rear components. The rear component 7 is arranged behind the mirror 9 and on the optical axis of the picture taking lens 2, while the other rear component 8 is optically identical with the component 7 and is arranged above the mirror 9 and at the same optical distance from the mirror as the component 7.

Some of the light entering the front component 6 of the supplementary lens system passes rearwardly through the mirror 9 and through the rear component 7 and into the regular photographic objective 2, to form the photographic image on the film 17. Thus the components 6 and 7 together form the supplementary lens for reducing the effective focal length of the objective 2, to permit close-up focusing.

The rest of the light entering the component 6 and striking the beam splitting mirror 9 is reflected upwardly to provide the focusing view finding image. These reflected rays pass first through a lens 8 which, as already stated, is identical to the lens 7 and arranged at an equal optical distance from the mirror 9. Rays emerging from the lens 8 strike an obliquely disposed reflecting mirror 10 arranged on the optical axis of the finder objective 3. Also arranged on this optical axis between the mirror 10 and the objective 3 is a lens 11 of negative refractive power, which compensates for the increased path length of the view-finder focusing beam as compared to the picture-taking beam.

Dividing the light incident on the beam splitting mirror 9 in the manner indicated produces a sufficiently bright image on the focusing screen 5 while yet allowing sufficient transmission of light to produce a good image on the film 17, especially when the present day high film sensitivities are considered. The path length compensation for the focusing image by the negative lens 11 is sufficient in practice, because the focusing range of a supplementary system such as the one described is comparatively small, due to the limited focusing ability of the camera at short focal length.

The parts of the supplementary optical system, that is, the lenses 6, 7, 8, and 11, and the mirrors 9 and 10, are desirably mounted in a common housing indicated schematically at 12. The housing 12 is preferably fitted with latching devices which latch the housing to the usual objective mounts 13 and 14 of the camera; for example, to the bayonet mounting lugs which are customary in the cameras above mentioned. Of course, the housing 12 may be connected in any other suitable manner to the front wall of the camera. The lenses 7 and 11 are at or close to the rear end of the housing 12, quite close to the camera lenses 2 and 3, so that these lenses 7 and 11 can be of quite moderate diameter, while the lens 6 is of much larger diameter in order to avoid limiting the angle of view.

In principle, no restrictions exist as regards the focal length dimensions of the supplementary lens system, so that such a supplementary system can be designed for a comparatively wide range, provided that the errors in the highly corrected objective 2 caused by the supplementary system do not become so great that it is inadvisable to use them. However, this restriction also exists with the normal supplementary lenses of photographic cameras.

Briefly reviewing the operation, light rays from the object to be photographed pass through the front lens 6 and are transmitted by the beam splitting mirror 9, and the lenses 7 and 2, and fall upon the film 17. A portion of the light striking the beam splitting mirror 9 is reflected upwardly to the supplementary lens 8, and after being reflected by the mirror 10, passes through the lenses 11 and 3. After being reflected by the focusing mirror 4, the image rays are reflected upwardly to the focusing screen 5. The focusing image appearing on the focusing screen 5 conforms to that on the film 17 in both format and perspective, even though an extreme close-up exposure is made.

The use of a supplementary optical system arranged according to the present invention is not limited to normal supplementary lenses in the size order from 1 to 5 diopters, but in principle may be used for other objective systems such as, for example, telephoto systems which lengthen the focal length.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

A supplementary optical attachment for close-up focusing for use with a twin lens reflex camera having an exposure objective and a focusing objective, said attachment comprising a first single lens component and a second single lens component axially alined with and axially separated from each other and adapted to be mounted in alinement with the optical axis of the exposure objective of the camera with which said attachment is to be used with said second component directly in front of the exposure objective, the diameter of said first component being sufficiently larger than that of the exposure objective when considered with said second component to pass a full cone of rays through the exposure objective, a beam splitting mirror mounted between said first and second components and extending across the optical axis of said components in oblique relation thereto so as to transmit part of the light passing along said optical axis and to reflect another part of such light at an angle to said axis, a second mirror offset from said optical axis and arranged obliquely thereto in position to receive light reflected by said beam splitting mirror and reflect such light toward the focusing objective of the camera with which said attachment is to be used, third and fourth single lens members both located in the path of light rays reflected by said beam splitting mirror and passing toward the focusing objective of the camera, said third lens member being located between said mirrors and being of substantially the same optical power as said second component, said fourth lens member being located in the path of light after reflection by said second mirror and being a negative lens to correct for the increased path of travel of rays of light reflected by said beam splitting mirror as compared with the path of travel of light transmitted through said beam splitting mirror, the axial separation of said first and second components being large enough to arrange said beam splitting mirror to pass the full cone of rays to the focusing objective, and the first and second lens components and the third and fourth lens members being chosen to shorten the effective focal length of the exposure and focusing objectives to enable the camera to be focused for close-up photography.

References Cited in the file of this patent

UNITED STATES PATENTS 2,239,379    Bucky    Apr. 22, 1941

FOREIGN PATENTS 718,724    Germany    Mar. 19, 1942